Oct. 7, 1958
J. S. DEGE
2,854,780
FISH PLUG
Filed June 28, 1954
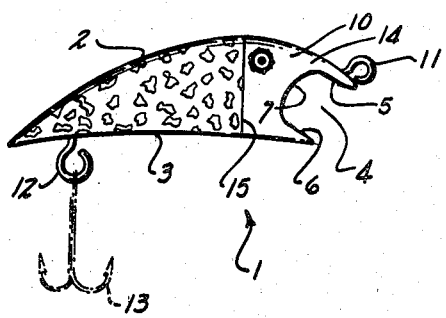
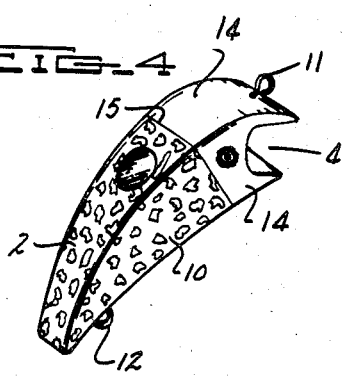
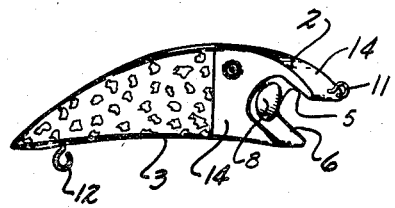
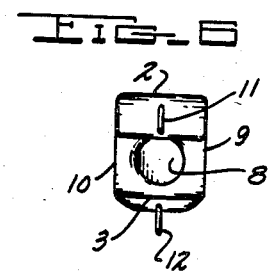
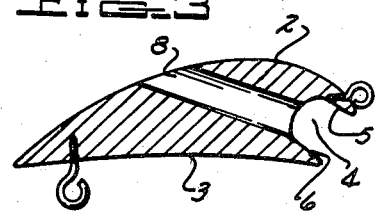
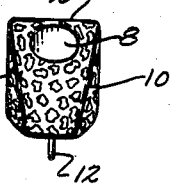
INVENTOR.
JOHN S. DEGE
BY
SMITH OLSEN & KOTTS
ATTORNEYS United States Patent Office 2,854,780
Patented Oct. 7, 1958

2,854,780

FISH PLUG

John S. Dege, Dearborn, Mich.

Application June 28, 1954, Serial No. 439,616

1 Claim. (Cl. 43—42.06)

This invention relates to fish lures and particularly to lures which simulate the movements of small fish.

When fish swim they move with a quick side to side darting or wiggling motion. They do not however roll over on their sides or backs but swim with their bellies down.

In order for a fish lure to simulate the movement of a fish the lure must be so constructed that when it is drawn through the water it will move with a darting or wiggling motion and remain upright without rolling or turning over.

It is an object of this invention to provide a fish lure which, when is is drawn through the water, will move with a fish-like darting or wiggling motion.

Another object is to provide a fish lure which, when it is drawn through the water, will not roll or turn over.

Another object is to provide a fish lure which will tend to remain in the water and not be lifted up by a pulling force along the fish line.

In achieving the above mentioned objects there is provided a tapered lure body of rectangular cross section having formed therein a passage positioned at an angle to the direction taken by the lure as it is drawn through the water. The lure body is also formed with a notch or recess at its front end for deflecting and directing a certain amount of water into the passage.

The effect produced by contouring the lure body in this manner is that when the lure is drawn through the water its rear end moves from side to side and causes the lure to move with a wiggling fish-like motion but with no tendency to turn over or leave the water.

In the drawings:

Figure 1 is a side elevational view of one embodiment of the invention.

Figure 2 is a bottom view of the embodiment shown in Figure 1.

Figure 3 is a cross sectional view taken on line 3—3 of Figure 2.

Figure 4 is a perspective view of the embodiment shown in Figure 1, taken from a point above, behind and to one side thereof.

Figure 5 is a perspective view of the embodiment shown in Figure 1, taken from a point in front and to one side thereof.

Figure 6 is a front view of the embodiment shown in Figure 1.

Figure 7 is a rear view of the embodiment shown in Figure 1.

Referring in greater detail to the drawings, there is shown a lure body 1 having an upper surface 2. Surface 2 is flat in a lateral direction but, as viewed in Figure 1, surface 2 is humped or convex in a longitudinal direction. The lower surface 3 of the lure body is flat in a lateral direction but slightly concave in a longitudinal direction as viewed in Figure 1. Side surfaces 9 and 10 of the lure body are substantially flat as can be seen in Figure 6. The contours of surfaces 2, 3, 9 and 10 are such as to give the lure body a rectangular cross section. This rectangular cross section is believed to have a stabilizing effect on the lure body tending to prevent it from rolling or turning over as it is moved through the water.

In order for the lure to move effectively to simulate the appearance of a fish, different areas thereof are painted in different colors. The front portions of surfaces 2, 3, 9 and 10 designated by reference numeral 14 are preferably painted yellow. The rear portion of surface 3 beyond line 15 is painted white to simulate the belly of a fish. The rear portions of surfaces 2, 9, and 10 beyond 15 are preferably painted green with white specks to simulate the back and side areas of a fish.

A screw eye is provided at 11 to which the fish line or leader (not shown) may be attached, and another screw eye is provided at 12 to which a fish hook 13 (shown in dotted lines) may be attached.

The front area of the lure is grooved or recessed at 4 to provide two substantially parallel opposing faces 5 and 6 interconnected by an arcuate face 7. Extending through the body of the lure in line with recess 4 is a circular passage 8. In the area of recess 4 side surfaces 9 and 10 are relatively far apart but as said surfaces approach the rear end of the lure body they tend to converge or taper.

Although it is not known exactly why the lure body moves through the water with the desired wiggling motion it is thought that such motion is due to the creation of low pressure areas alongside the converging areas of surfaces 9 and 10. As the lure moves through the water arcuate face 7 will push against the water causing part thereof to be deflected through passage 8 and part thereof to be deflected outward laterally of the lure body. It is thought that there will be created high pressure areas alongside walls 9 and 10 at the front end of the lure body and low pressure areas alongside walls 9 and 10 at the rear end of the lure body. These low pressure areas are believed at least partly responsible for the darting or wiggling motion which is obtained.

A wiggling action has been obtained by providing the lure body with recess 4 and without providing passage 8. For some reasons however a better wiggling action is obtained when the lure body is also provided with passage 8.

Faces 5, 6, and 7 form a pocket which is believed responsible not only for the build up of a high pressure area at the front of the lure body but also for the establishment of a stabilizing force tending to prevent overturning or rolling of the lure body around its longitudinal axis. Thus, if a force were applied to the lure body tending to rotate it around its longitudinal axis the high pressure water between the jaws formed by surfaces 5 and 6 would react on surfaces 5 and 6 against the rotating force, and in this way the lure body would tend to remain in its desired position.

The pocket formed by recess 4 has the further function of preventing the lure body from being lifted up out of the water. Thus if a force were applied to the lure body tending to lift is out of the water the high pressure water in recess 4 would react on surface 6 against the force, and in this way the lure body would tend to remain in the water and not be lifted up.

Functionally speaking lures constructed according to the teachings of this invention are considered to be advantageous in that when they are drawn through the water they move with a fish-like wiggle and without any tendency to roll over or leave the water.

The structural features which accomplish these advantageous results are set forth in the following claim.

I claim.

A fish lure comprising an elongated body having substantially flat side surfaces, said surfaces including two parallel flat surface portions at the front of the lure body and two flat surface portions extending rearwardly from said parallel surface portions with a slight convergence, said converging surface portions terminating substantial distances apart at the rear of the lure body; an upper surface, flat in a lateral direction but convex in a longitudinal direction; a lower surface substantially flat in a direction but slightly concave in a lateral longitudinal direction, said lower face diverging from the rear edge of said upper surface toward the front of the lure body; a notch formed between said upper and lower surfaces and extending laterally through the lure body at the front end thereof the present two substantially flat but parallel faces extending from the upper and lower lure body surfaces and interconnected by a third face; a rearwardly and upwardly inclined passage leading from the interconnecting face to a central point on the upper surface of the lure body, and means at the front end of said convex upper surface for attaching the lure body to a fiish line.

References Cited in the file of this patent

UNITED STATES PATENTS

| | | |
|---|---|---|
| D. 158,349 | Wiinikka | Apr. 25, 1950 |
| 1,099,606 | Larrabee | June 9, 1914 |
| 1,558,470 | Gibson | Oct. 27, 1925 |
| 1,609,855 | Bayer | Dec. 7, 1926 |
| 1,848,704 | Farley | Mar. 8, 1932 |
| 1,900,832 | Martin | Mar. 7, 1933 |
| 2,542,776 | Key | Feb. 20, 1951 |
| 2,751,704 | Gusdanovic | June 26, 1956 |

UNITED STATES PATENT OFFICE
CERTIFICATE OF CORRECTION

Patent No. 2,854,780                                        October 7, 1958

John S. Dege

It is hereby certified that error appears in the printed specification of the above numbered patent requiring correction and that the said Letters Patent should read as corrected below.

Column 1, line 27, for "is", first occurrence, read -- it --; column 2, line 61, for "lift is" read -- lift it --; column 3, line 11, insert "lateral" before "direction"; same line 11, before "longitudinal" strike out "lateral"; column 3, line 16, for "thereof the" read -- thereof to --; column 4, line 5, for "fiish" read -- fish --.

Signed and sealed this 8th day of March 1960.

(SEAL)
Attest:

KARL H. AXLINE
Attesting Officer

ROBERT C. WATSON
Commissioner of Patents